(12) United States Patent
Keith et al.

(10) Patent No.: US 8,474,599 B2
(45) Date of Patent: Jul. 2, 2013

(54) DRIVE FOR PALLET CHANGER

(75) Inventors: Malcolm E. Keith, Algonquin, IL (US); Michael Paul Cayley, Sr., South Barrington, IL (US)

(73) Assignee: Midaco Corporation, Elk Grove Village, IL (US)

( * ) Notice: Subject to any disclaimer, the term of this patent is extended or adjusted under 35 U.S.C. 154(b) by 64 days.

(21) Appl. No.: 12/931,380

(22) Filed: Jan. 31, 2011

(65) Prior Publication Data

US 2011/0186403 A1   Aug. 4, 2011

Related U.S. Application Data

(60) Provisional application No. 61/337,223, filed on Feb. 1, 2010.

(51) Int. Cl.
*B65G 47/84* (2006.01)

(52) U.S. Cl.
USPC .................................. 198/468.9; 198/346.1

(58) Field of Classification Search
USPC ................... 198/346.1, 346.2, 468.9
See application file for complete search history.

(56) References Cited

U.S. PATENT DOCUMENTS

| | | | | |
|---|---|---|---|---|
| 5,044,486 A | * | 9/1991 | Kitamura | 198/346.1 |
| 5,115,901 A | * | 5/1992 | Santandrea et al. | 198/346.1 |
| 5,131,125 A | * | 7/1992 | Coron | 198/346.1 |
| 5,915,916 A | * | 6/1999 | Saji | 198/468.9 |
| 6,193,048 B1 | | 2/2001 | Keith | |
| 7,591,619 B1 | * | 9/2009 | Chang et al. | 409/212 |

* cited by examiner

*Primary Examiner* — James R Bidwell
(74) *Attorney, Agent, or Firm* — Pauley Peterson & Erickson

(57) ABSTRACT

An automatic machining system having one or more pallets each mounted with respect to a moveable bed, for transporting one or more workpieces to and/or from an automated machine tool, for machining each workpiece. According to this invention, a driver shaft and a driven shaft can be longitudinally aligned with respect to each other, so that there is no need for a gear system and/or a transmission device, for transferring power from a driver shaft to the driven shaft.

16 Claims, 4 Drawing Sheets

DRIVE FOR PALLET CHANGER

The entire disclosure of U.S. Provisional Patent Application 61/337,223, filed 1 Feb. 2010, to which a priority benefit is claimed by this U.S. Patent Application under Title 35, United States Code, Section 119 and/or 120, including the entire teachings are incorporated, by reference, into this specification. This U.S. Patent Application claims the priority benefit of U.S. Provisional Patent Application 61/337,223, filed on 1 Feb. 2010.

BACKGROUND OF THE INVENTION

1. Field of the Invention

This invention relates to a driver, a drive or a drive unit, particularly a direct drive unit for an automatic machining center having a moveable bed, such as a pallet changer device.

2. Discussion of Related Art

Many know drivers are used with conventional pallet changers to move a pallet or other structural support device from one position to another position. In some pallet changers, the pallet moves along a track and carries a workpiece between at least two different positions. At least at one position, the workpiece on the pallet is machined automatically with a robot and/or manually by a worker.

In some conventional pallet changers, two different pallets are moveably mounted and each can be fixed in at least two different positions or locations. In some conventional pallet changers, each pallet has a dedicated track along which the pallet moves between different working positions. Mechanical and/or electrical components or elements are used to move each pallet and then fix each pallet into a desired position.

In some conventional pallet changers, a carriage is moveably mounted with respect to a housing, a frame or another suitable support structure. As the carriage moves it can be selectively engaged with a first pallet or a second pallet. Once engaged, a linear drive device can move the carriage which is attached with respect to the pallet. The carriage can be moved or engaged to move the pallet along a corresponding track or another guide member.

In some conventional pallet changers, a motor, such as an electric motor engages, such as through gears, a pulley and/or any other mechanical connector or drive element. In some conventional pallet changers, a drive screw or an actuator screw is moved or rotated to then move the carriage and thus a corresponding pallet and associated workpiece.

Many conventional drive units have a motor that is positioned at a distance from the drive screw or other similar drive element. Because of the distance between a rotating shaft of the motor and the drive screw, gears, a pulley and/or any other connector or power transmission element is required to transfer rotational power from the motor shaft to the drive screw or other similar drive unit.

There is an apparent need to simplify the drive, the driver and/or the drive unit, in an effort to reduce costs and minimize production downtime.

SUMMARY OF THE INVENTION

Automated pallet changer systems are used to increase production efficiency, such as by automating an otherwise manually performed manufacturing step or operation. Automatic pallet changer systems can reduce the number of workers required to produce a part or component, such as by performing a machining operation. Manufacturing costs can also be saved by reducing initial equipment costs, by reducing maintenance costs, and/or by increasing the speed of the automated system.

The automatic machining system of this invention can be used to eliminate a gear system and/or a power transmission device, for example by aligning a driver element and a driven element. For example, the automatic machining system of this invention can be used to eliminate rocker piston 36 and gear box 10 as taught by U.S. Pat. No. 6,193,048.

In some embodiments of this invention, by aligning a driver shaft and a driven shaft which moves a carriage element or other similar element, many power transmission elements can be eliminated, particularly if a distance between centerline axes of the driver shaft and the driven shaft is either significantly reduced or eliminated.

The automatic machining system of this invention can reduce installation costs, maintenance costs and operating costs associated with machining or manufacturing machined parts.

BRIEF DESCRIPTION OF THE DRAWINGS

This invention is better understood when the specification is taken in view of the following drawings, wherein.

DETAILED DESCRIPTION OF THE INVENTION

Many structures or apparatuses and the methods or processes for using the structures or apparatuses are known to those skilled in the art of designing and using automatic pallet changer systems, particularly in automatic machining centers. U.S. Pat. No. 6,193,048 teaches a conventional pallet changer and methods and processes for using the pallet changer. The entire teachings of U.S. Pat. No. 6,193,048 are incorporated into this specification by reference to U.S. Pat. No. 6,193,048. Some of the features of this invention are similar to corresponding features taught by U.S. Pat. No. 6,193,048, and features taught by U.S. Pat. No. 6,193,048 are intended to be integrated with and made a part of this specification.

Figure 1:
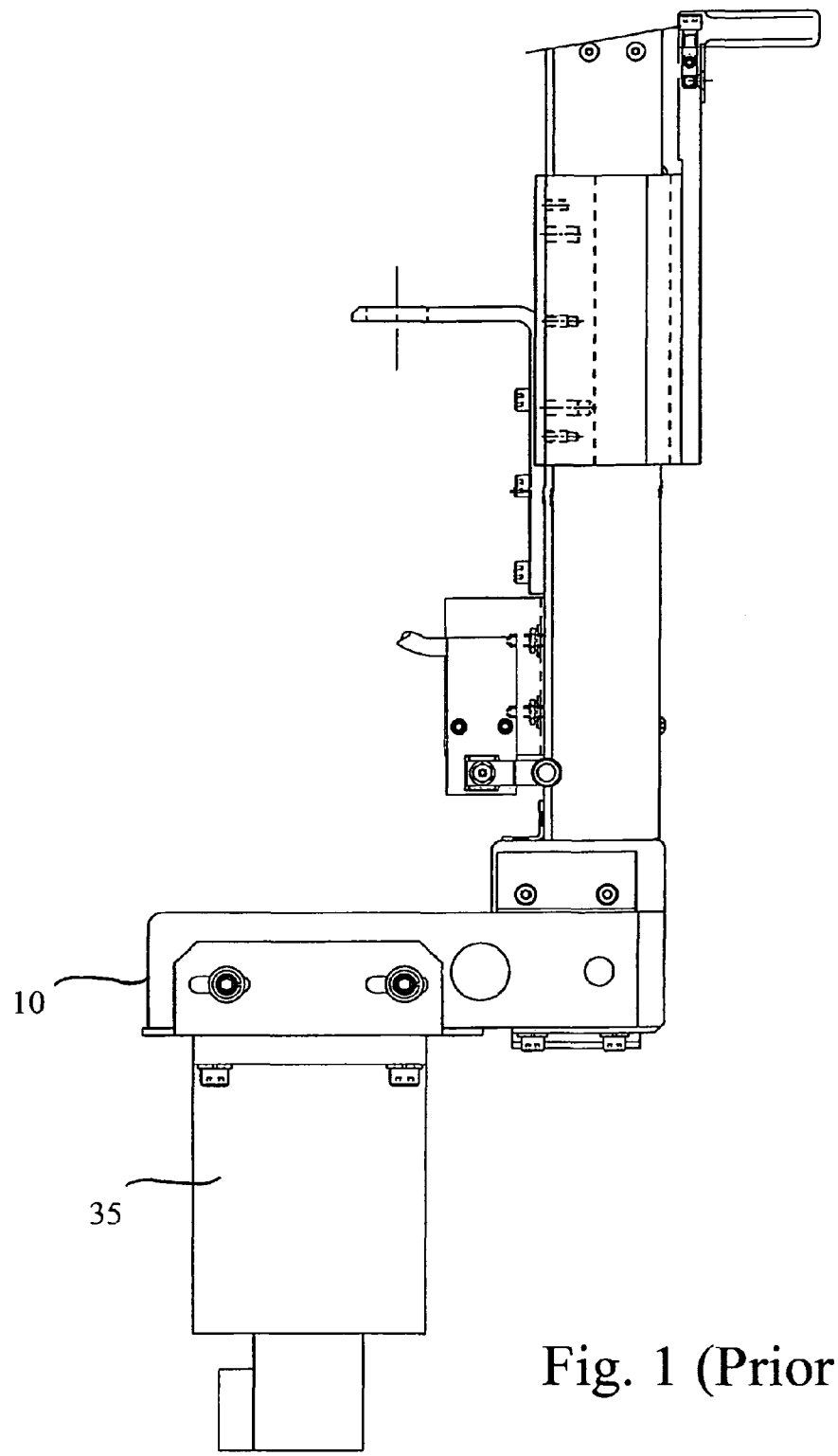
FIG. 1 is a top view of a conventional motor drive attached to a transmission box, according to prior art.
Figure 2:
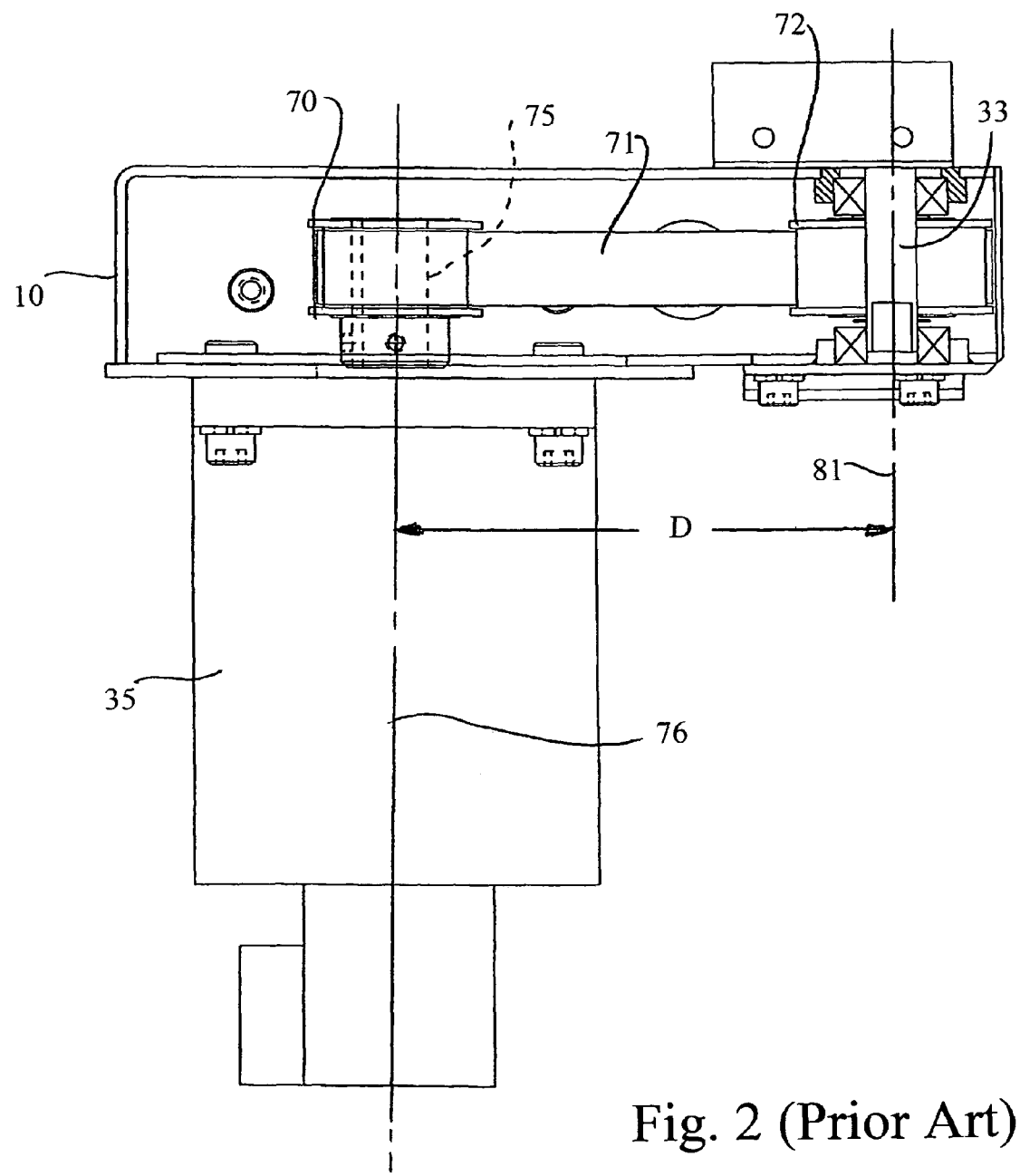
FIG. 2 is a partial sectional view of the conventional motor drive, showing drive elements within the transmission box, as shown in FIG. 1.

FIGS. 1 and 2 show one embodiment of a conventional drive unit for a pallet changer. As shown in FIG. 1, servo motor 35 is connected to gear box 10. As shown in FIG. 2, pulley 70 is connected with respect to drive shaft or shaft 75 of servo motor 35. As used throughout this specification and the claims, the terms drive shaft and shaft are intended to relate to and be interchangeable with each other. Servo motor 35 can be any suitable driver, such as an electric motor, a pneumatic motor and/or any other suitable electrical, mechanical, magnetic or other motor or driver that can apply a torque force upon shaft 75. As used throughout this specification and in the claims, the term driver is intended to relate to and be interchangeable with each and every term in the preceding sentence as well as any other suitable drive, drive unit or other type of mechanical power transfer device.

As shown in FIG. 2, pulley 72 is connected with respect to drive shaft or drive screw 33 or another suitable actuator screw. As used throughout this specification and in the claims, the terms drive shaft and drive screw are intended to relate to and be interchangeable with each other. Because there is a distance D between axis 76 of drive shaft 75 and axis 81 of drive shaft 33, as shown in FIG. 2, belt 71 is used to transfer driving power from drive shaft 75 to drive shaft 33.

Gear box 10 can include the elements such as shown in FIG. 2 and/or can include any other suitable gears, pulleys, belts, chains and/or any other drive element know to those skilled in the art of power transmission, such as to transfer driving forces from a driver to a driven element. As shown in FIG. 2, pulley 70, belt 71, pulley 72 and the associated bearings are exposed to mechanical wear during an operating life of the corresponding drive elements. When any of these drive elements must be replaced, such as due to wear and/or failure, the entire pallet changer system must shutdown or discontinue operation, which results in unexpected down time and thus loss of machine running time and production time.

Figure 4:
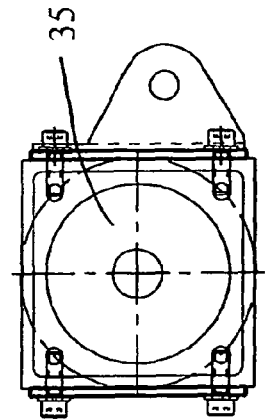
FIG. 4 is a front view of the direct drive, as shown in FIG. 3.
Figure 5:
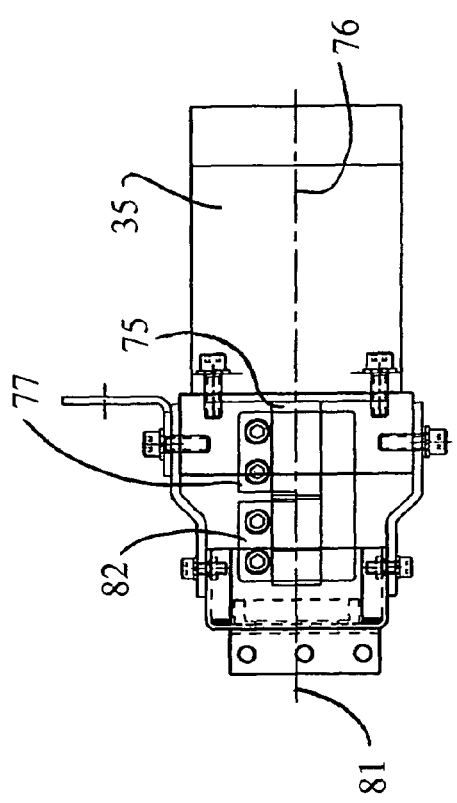
FIG. 5 is a top view of the direct drive, as shown in FIGS. 3 and 4.
Figure 3:
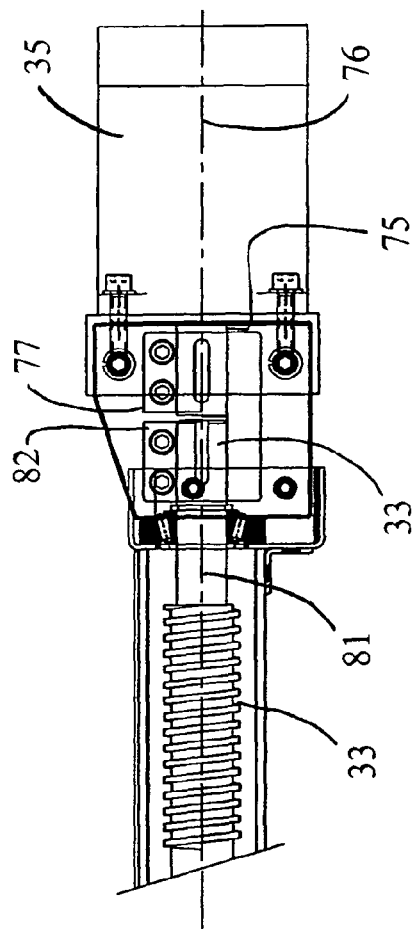
FIG. 3 is a side view of a direct drive, according to one embodiment of this invention.

FIGS. 3-5 show one embodiment of a driver or a drive unit that can use a gearless or gear-free drive system, for example to transfer power or torque from drive shaft 75 to or between drive shaft 33, and thus eliminate the need for gear box 10. As shown in FIGS. 3 and 5, axis 76, which can be a center axis, of shaft 75 of servo motor 35 is aligned, such as longitudinally aligned, with axis 81, which can be a center axis, of drive shaft 33. In some embodiments according to this invention, the direct drive can power or provide a torque or other force to drive shaft 75, and thus can be a direct drive power or a direct drive source for drive shaft 33 and/or drive shaft 75. With the alignment of axis 76 and axis 81, servo motor 35 can be a direct drive, a direct driver or a direct drive unit. In some embodiments according to this invention, a rotational axis is aligned with and comprises or includes axis 76 and/or axis 81.

As used throughout this specification and in the claims, the terms coupling, coupling part and coupler are intended to relate to, and be interchangeable with each other. In some embodiments according to this invention, coupling part or coupling 77 is secured, connected and/or otherwise attached with respect to coupling part or coupling 82. Any suitable connector, attachment and/or other securing device can be used to connect or attach coupling part or coupling 77 directly to and/or with respect to coupling part or coupling 82.

In the embodiments of this invention as shown in FIGS. 3-5, coupling part 82 is secured or otherwise connected with respect to drive shaft 33. Likewise, coupling part 77 is secured or otherwise connected with respect to drive shaft 75. Coupling part 77 is shown in FIGS. 3 and 5 as mechanically connected to coupling part 82, preferably in an aligned manner. In some embodiments according to this invention, the overall rotational axis is aligned with and comprises axis 76 of drive shaft 75, axis 81 of drive shaft 33, a center axis of coupling part or coupling 77 and/or a center axis of coupling part or coupling 82. Any other suitable coupling, connector and/or other coupling device can be used to connect drive shaft 75 with respect to drive shaft 33, particularly so that gear box 10 is not necessary and thus the driver can transfer power, torque or any other suitable force to drive shaft 33 by, with or using a gearless or a gear-free drive train or system. In the embodiments shown in FIGS. 3-5, servo motor 35 directly drives drive screw 33.

Figure 7:
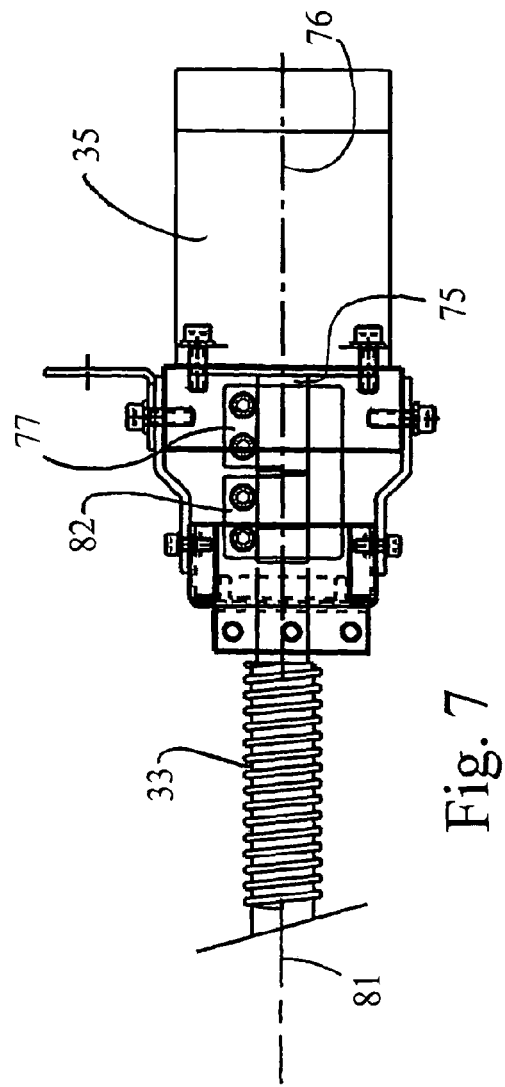
FIG. 7 is a top view of the direct drive, as shown in FIG. 6.
Figure 6:
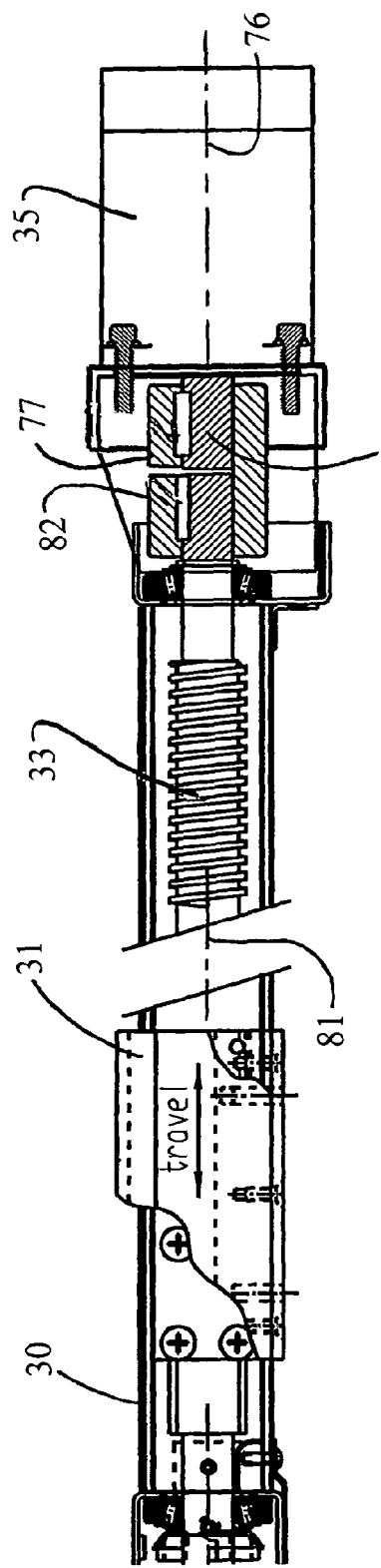
FIG. 6 is a partial sectional side view of a direct drive and a driven carriage, according to one embodiment of this invention.

FIGS. 6 and 7 show another embodiment of a direct driver or a direct drive arrangement between servo motor 35 and drive shaft 33. As shown in FIG. 6, coupling part 77 is connected directly to, integrated with and/or connected with respect to coupling 82. With the arrangement shown in FIGS. 6 and 7, drive shaft 75 directly drives drive shaft 33. By rotating drive shaft 33, carriage 31 can move or be moved with respect to carriage guide 30. Any other suitable coupling or connector can be used to align drive shaft 75 with respect to drive shaft 33, so that servo motor 35 or another suitable driver provides a direct drive or a direct power source to drive shaft 33.

By using a direct drive arrangement between servo motor 35 or another suitable driver and drive shaft 33, it is possible to eliminate the need for rocker piston 36, as described in U.S. Pat. No. 6,193,048, because the direct drive arrangement and/or a controller of this invention can be programmed to operate in a similar manner to produce the same result of selecting and/or moving one of a plurality of workpieces 16 or 17, such as shown 2 in U.S. Pat. No. 6,193,048.

By using a direct drive according to this invention, it is also possible to eliminate the need for gear box 10 and thus have a gearless transmission or a gear-free drive system, particularly between drive shaft 75 and drive shaft 33. By eliminating elements or components of a pallet changer, it is possible to reduce initial equipment costs, installation costs, maintenance costs and also to minimize labor losses and production loses resulting from machine downtime.

With a direct drive unit according to this invention, it is possible to achieve increased velocity of carriage 31. By moving the pallet and the workpiece relatively faster, it is possible to reduce labor time associated with workpieces and thus increase production efficiency.

In some embodiments according to this invention, an automatic machining system has a pallet mounted with respect to a bed that is moveable with respect to an automated machine tool, for example as taught by U.S. Pat. No. 6,193,048, such as for transporting one or more different workpieces to or from the automated machine tool for machining the workpiece. In some embodiments of this invention, carriage 31, such as shown in FIG. 6, is movably mounted with respect to drive shaft 33, the driver moves drive shaft 75, and drive shaft 33 and drive shaft 75 are longitudinally aligned and coupled with respect to each other. As shown in FIGS. 3, 6 and 7, drive shaft 33 comprises a screw element or shaft having external threads that are drivingly engageable with a corresponding receiver of carriage 31. In some embodiments of this invention, the screw has external threads that engage with corresponding threads or other suitable structure of carriage 31, to move carriage 31 upon movement of the external threads of the screw portion of drive shaft 33.

In some embodiments of this invention, the coupling part or coupling 77 is connected to coupling part or coupling 82 in an efficient manner. Some couplings are more efficient than other couplings, particularly when transferring power from drive shaft 75 to drive shaft 33.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. In an automatic machining system having a pallet mounted with respect to a bed moveable with respect to an automated machine tool, wherein the pallet transports a workpiece to or from the automated machine tool for machining the workpiece, the improvement comprising: a carriage movably mounted with respect to a first drive shaft, a driver moving a second drive shaft, and the first drive shaft and the second drive shaft longitudinally aligned and coupled with respect to each other, wherein a coupling directly connects the first drive shaft with respect to the second drive shaft, the coupling including a first coupling part receiving the first drive shaft, a second coupling part receiving the second drive shaft, and the first coupling part mechanically connected to the second coupling part.

2. In the automatic machining system according to claim 1, wherein a first center axis of the first drive shaft is longitudinally aligned with a second center axis of the second drive shaft.

3. In the automatic machining system according to claim 2, wherein a rotational axis is aligned with and comprises the first center axis and the second center axis.

4. In the automatic machining system according to claim 1, wherein a rotational axis is aligned with and comprises a first center axis of the first drive shaft, a second center axis of the second drive shaft, a first coupling center axis of the first coupling and a second coupling center axis of the second coupling.

5. In the automatic machining system according to claim 1, wherein the drive shaft comprises a drive screw drivingly engageable with the carriage.

6. In the automatic machining system according to claim 5, wherein the drive screw has external threads that engage with and move the carriage upon movement of the drive screw.

7. In the automatic machining system according to claim 1, wherein the driver comprises a motor applying a torque upon the second drive shaft.

8. In the automatic machining system according to claim 7, wherein a coupling is connected to the second drive shaft and transfers at least a portion of the torque to the first drive shaft.

9. In the automatic machining system according to claim 7, wherein the motor comprises a servo motor, an electric motor, a pneumatic motor, and/or a magnetic motor.

10. In the automatic machining system according to claim 7, wherein the motor is a direct drive for the first drive shaft.

11. In the automatic machining system according to claim 7, wherein the motor is a direct drive power source for the first drive shaft.

12. In the automatic machining system according to claim 1, wherein the driver transfers a torque to the first drive shaft using a gearless drive system.

13. In an automatic machining system having a pallet moveable with respect to an automated machine tool, wherein the pallet transports a workpiece with respect to the automated machine tool, the improvement comprising: a carriage movably mounted with respect to a first drive shaft, a driver moving a second drive shaft, and a first center axis of the first drive shaft longitudinally aligned with a second center axis of the second drive shaft, and a coupling directly connecting the first drive shaft to the second drive shaft, the coupling first coupling part receiving the first drive shaft, a second coupling part receiving the second drive shaft and the first coupling part mechanically connected to the second coupling part.

14. In the automatic machining system according to claim 13, wherein the driver transfers a torque to the first drive shaft with a gearless drive system.

15. In an automatic machining system having a pallet attachable to a bed moveable with respect to an automated machine tool, wherein the pallet transports a workpiece to or from the automated machine tool, the improvement comprising: a first drive shaft moveable with respect to the pallet, a driver moving a second drive shaft, and the first drive shaft and the second drive shaft longitudinally aligned and directly coupled with respect to each other, wherein a coupling directly connects the first drive shaft with respect to the second drive shaft, the coupling including a first coupling part receiving the first drive shaft, a second coupling part receiving the second drive shaft and the first coupling part mechanically connected to the second coupling part.

16. In the automatic machining system according to claim 15, wherein the driver transfers a torque to the first drive shaft with a gearless drive system.

* * * * *